US005847872A

United States Patent [19]
Ito

[11] Patent Number: 5,847,872
[45] Date of Patent: Dec. 8, 1998

[54] CIRCUMFERENTIALLY ISOTROPIC PHASE PLATE, METHOD OF MAKING THE SAME, METHOD OF FORMING BUNDLE OF RAYS USING THE SAME, AND POLARIZATION MEASURING APPARATUS AND METHOD USING THE SAME

[75] Inventor: Yoshinobu Ito, Kawasaki, Japan

[73] Assignee: Nikon Corporation, Tokyo, Japan

[21] Appl. No.: 755,260

[22] Filed: Nov. 22, 1996

[30] Foreign Application Priority Data

Nov. 24, 1995 [JP] Japan ..................................... 7-329792
Sep. 10, 1996 [JP] Japan ..................................... 8-262430

[51] Int. Cl.$^6$ .............................. G02B 5/30; G01J 4/00
[52] U.S. Cl. ..................... 359/494; 359/483; 359/900; 356/365; 356/367
[58] Field of Search ................................... 356/364, 365, 356/367; 359/483, 485, 489, 494, 498, 900

[56] References Cited

U.S. PATENT DOCUMENTS

| 3,617,934 | 11/1971 | Segre | 372/105 |
|---|---|---|---|
| 5,199,042 | 3/1993 | Papetti et al. | 372/95 |
| 5,257,132 | 10/1993 | Ceglio et al. | 359/589 |
| 5,587,793 | 12/1996 | Nakai et al. | 356/367 |

OTHER PUBLICATIONS

Thomas V. Higgins, "Spiral Waveplate Design Produces Radially Polarized Laser Light", Laser Focus World, vol. 28, No. 4, pp. 18–20, Apr. 1992.

Tae Jin Kim, et al. "Volume Holographic Phase–Retardation Elements", Optics Letters, vol. 20, No. 19, pp. 2030–2032, Oct. 1995.

Fang Xu, et al., "Fabrication, Modeling, and Characterization of Form–Birefringent Nanostructures", Optics Letters, vol. 20, No. 24, pp. 2457–2459, Dec. 1995.

Oyo Butaurl Kogaku Sensho (Applied Physical Engineering Selection) :2 Oyo Kogaku (Applied Optical) II, Tokyo: Balfukan, 1990, pp. 192–195.

M. Born and E. Wolf, Principles of Optics, 3rd edition, pp. 705–708, Jan. 1950, Pergamon Press, London.

*Primary Examiner*—Ricky D. Shafer
*Assistant Examiner*—John Juba, Jr.
*Attorney, Agent, or Firm*—Foley & Lardner

[57] ABSTRACT

The circumferentially isotropic phase plate of the present invention includes (i) a plurality of first material layers which are formed by a first material on a transparent substrate and disposed in concentric circles around a predetermined axis within a plane orthogonal to an incident direction of a bundle of rays and (ii) a plurality of second material layers which are formed by a second material having a refractive index different from that of the first material and disposed in concentric circles around the predetermined axis so as to fill a space between the plurality of the first material layers, wherein the plurality of the first and second material layers are formed such that each layer thickness along the incident direction of the bundle of rays becomes uniform along a circumferential direction of the concentric circles, thereby constituting, as a whole, a form birefringent body which is isotropic in the circumferential direction of the concentric circles. Accordingly, the bundle of rays transmitted through this phase plate has a polarization distribution in which at least one of ellipticity and principal-axis azimuth continuously changes along the circumferential direction around the predetermined axis.

30 Claims, 12 Drawing Sheets

CIRCUMFERENTIALLY ISOTROPIC PHASE PLATE, METHOD OF MAKING THE SAME, METHOD OF FORMING BUNDLE OF RAYS USING THE SAME, AND POLARIZATION MEASURING APPARATUS AND METHOD USING THE SAME

BACKGROUND OF THE INVENTION

1. Field of the Invention

The present invention relates to a phase plate which has an optic axis radially disposed around a predetermined axis and is isotropic in its circumferential direction, a method of making the same, a method of forming a bundle of rays which has a polarization distribution changing in the circumferential direction by use of this phase plate, and an apparatus and method for measuring the principal-axis azimuth and ellipticity of elliptically polarized light using this phase plate.

2. Related Background Art

Since optic axes in crystals such as mica, calcite, and rock crystal are spatially uniform, effects of phase plates utilizing these crystals also become spatially uniform. For example, when linearly polarized light is incident on a quarter wavelength plate which belongs to such a phase plate, it is assumed that the linearly polarized light has a vibrating direction tilted with respect to the optic-axis azimuth of the quarter wavelength plate by an angle of 45°. In this case, since the same relationship is established at all the positions in the quarter wavelength plate, the light transmitted through the quarter wavelength plate becomes spatially uniform circularly polarized light in terms of polarization state.

In order to form light having spatially different polarization states by using the conventional phase plate, a plurality of phase plates having optic-axis azimuths different from each other are spatially disposed. For example, in a quarter wavelength plate complex in which 16 pieces of circular quarter wavelength plate elements are arranged in a circle, the respective optic-axis azimuths of these quarter wavelength plate elements are set along the radial directions of the circle formed by these elements. Here, in this quarter wavelength plate complex, the optic-axis azimuths of the neighboring elements differ from each other by 22.5°.

When linearly polarized light is incident on the quarter wavelength plate complex, the light transmitted therethrough becomes, in terms of polarization state, elliptically polarized light whose ellipticity and principal-axis azimuth have changed so as to correspond to the quarter wavelength plate element through which it has been transmitted. Namely, the transmitted bundle of rays attains a polarization distribution in which ellipticity and principal-axis azimuth discretely change along the circumferential direction of the circle formed by the arranged elements such that the polarization state repeatedly changes in a sequence of linearly polarized light, elliptically polarized light, and circularly polarized light.

For measuring the principal-axis azimuth and ellipticity of elliptically polarized light, a technique called Senarmont method has been known. The Senarmont method is disclosed in a book such as Tadao Tsuruta, *Oyo Butsuri Kogaku Sensho (Applied Physical Engineering Selection) 2: Oyo Kogaku (Applied Optics) II*, (Tokyo: Baifukan, 1990). A measuring apparatus adopting the Senarmont method comprises a normal quarter wavelength plate which is constituted with its optic-axis azimuth set to the same direction at all the positions and a linearly-polarizing device which is disposed downstream of this quarter wavelength plate as an analyzer.

In this measuring apparatus, in the case where elliptically polarized light to be measured having a principal-axis azimuth Ψ and an ellipticity X is incident on the quarter wavelength plate, when the quarter wavelength plate is rotated within a plane perpendicular to the optical axis of the optical system so as to attain a state where the optic axis (retarded-phase axis or advanced-phase axis) of the quarter wavelength plate coincides with the principal-axis azimuth of the elliptically polarized light to be measured, the light transmitted through the quarter wavelength plate becomes, in terms of polarization state, linearly polarized light which vibrates along an azimuth of (Ψ+X). Subsequently, when the analyzer is rotated within a plane perpendicular to the optical axis of the optical system so as to attain a state where the transmission axis of the analyzer is orthogonal to the vibrating direction of the linearly polarized light component of the light to be measured, the light quantity transmitted through the analyzer is nullified.

Thus, when the optic-axis azimuth of the quarter wavelength plate and the transmission-axis azimuth of the analyzer are measured in an extinction state which is realized as these two polarizing devices are independently rotated in a trial-and-error manner around the optical axis of the optical system, the principal-axis azimuth Ψ and the ellipticity X can be determined through simple calculations.

SUMMARY OF THE INVENTION

It is an object of the present invention to provide a circumferentially isotropic phase plate which can attain a bundle of rays with a polarization distribution in which at least one of ellipticity and principal-axis azimuth continuously changes along a circumferential direction around a predetermined axis, and a method of making the same.

Also, it is an object of the present invention to provide a method of forming a bundle of rays, which uses a circumferentially isotropic phase plate and can yield a bundle of rays with a polarization distribution in which at least one of ellipticity and principal-axis azimuth continuously changes along a circumferential direction around a predetermined axis.

Further, it is an object of the present invention to provide a polarization measuring apparatus which is equipped with a circumferentially isotropic phase plate and in which, as a single polarizing device is rotated around the optical axis of the optical system, the polarization state of elliptically polarized light can be measured easily and efficiently, and a measuring method using the same.

In order to achieve one of the above-mentioned objects, the circumferentially isotropic phase plate of the present invention comprises (i) a plurality of first material layers which are formed by a first material on a transparent substrate and disposed in concentric circles around a predetermined axis within a plane orthogonal to an incident direction of a bundle of rays and (ii) a plurality of second material layers which are formed by a second material having a refractive index different from that of the first material and disposed in concentric circles around the predetermined axis so as to fill a space between the plurality of the first material layers, wherein the plurality of the first and second material layers are formed such that each layer thickness along the incident direction of the bundle of rays becomes uniform along a circumferential direction of the concentric circles, thereby constituting, as a whole, a form birefringent body which is isotropic in the circumferential direction of the concentric circles.

In the phase plate of the present invention, when the plurality of the first and second material layers are formed such that each layer thickness along the incident direction of the bundle of rays is changed along a radial direction of the concentric circles or such that each layer width along a radial direction of the concentric circles is changed for each of the first and second materials, these plurality of first and second material layers are constituted so as to become, as a whole, a form birefringent body having a phase modulation effect which changes in the radial direction of the concentric circles though isotropic in the circumferential direction of the concentric circles.

Preferably, in the phase plate of the present invention, the plurality of the first and second material layers are formed such that each layer thickness along the incident direction of the bundle of rays further becomes uniform along the radial direction of the concentric circles, while each layer width along the radial direction of the concentric circles is made constant for each of the first and second material layers at any circular portion of the concentric circles, thereby constituting, as a whole, a form birefringent body which is isotropic in the circumferential direction of the concentric circles and uniform in the radial direction of the concentric circles.

More preferably, in this case, each layer thickness and each layer width of the plurality of the first and second material layers are set according to the wavelength of the bundle of rays such that the form birefringent body functions as a quarter wavelength plate with respect to the bundle of rays.

Here, desirably, by using a common layer thickness t for the plurality of the first and second material layers, each layer width $t_1$ and refractive index $n_1$ of the plurality of the first material layers, each layer width $t_2$ and refractive index $n_2$ of the plurality of the second material layers, and a constant m which is zero or a natural number, the form birefringent body is formed so as to satisfy the following group of expressions:

$t=(2m+1)\lambda/[4(n_0-n_0)]$,
$n_0^2=f_1n_1^2+f_2n_2^2$,
$n_e^2=n_1^2n_2^2/(f_1n_2^2+f_2n_1^2)$,
$f_1=t_1/(t_1+t_2)$, and
$f_2=t_2/(t_1+t_2)$.

Also, more preferably, each layer thickness and each layer width of the plurality of the first and second material layers are set according to the wavelength of the bundle of rays such that the form birefringent body functions as a half wavelength plate with respect to the bundle of rays.

Here, desirably, by using a common layer thickness t for the plurality of the first and second material layers, each layer width $t_1$ and refractive index $n_1$ of the plurality of the first material layers, each layer width $t_2$ and refractive index $n_2$ of the plurality of the second material layers, and a constant n which is zero or a natural number, the form birefringent body is formed so as to satisfy the following group of expressions:

$t=(2n+1)\lambda/[2(n_0-n_e)]$,
$n_0^2=f_1n_1^2+f_2n_2^2$,
$n_e^2=n_1^2n_2^2/(f_1n_2^2+f_2n_1^2)$,
$f_1=t_1/(t_1+t_2)$, and
$f_2=t_2/(t_1+t_2)$.

Next, in order to achieve one of the above-mentioned objects, the method of making a circumferentially isotropic phase plate in accordance with the present invention comprises (i) a first step of depositing a first material on a transparent substrate so as to form a first material layer; (ii) a second step of drawing a plurality of boundaries in concentric circles around a predetermined axis in the first material layer within a plane orthogonal to the predetermined axis; (iii) a third step of selectively eliminating any of a plurality of regions held between the plurality of boundaries in the first material layer so as to form a plurality of first material layers in concentric circles around the predetermined axis; (iv) a fourth step of depositing, on the transparent substrate, a second material having a refractive index different from that of the first material so as to form a plurality of second material layers in concentric circles around the predetermined axis, filling a space between the plurality of the first material layers; and (v) a fifth step of polishing the plurality of the first and second material layers such that each layer thickness of the plurality of the first and second material layers along the direction of the predetermined axis becomes uniform along a circumferential direction of the concentric circles, thereby constituting the first and second material layers, as a whole, as a form birefringent body which is isotropic in the circumferential direction of the concentric circles.

In the method of making a phase plate in accordance with the present invention, preferably, in the fifth step, each layer thickness of the plurality of the first and second material layers along the direction of the predetermined axis is set so as to further become uniform along a radial direction of the concentric circles, while each layer width of the plurality of the first and second material layers along the radial direction of the concentric circles is made constant for each of the first and second materials at any circular portion of the concentric circles, thereby constituting, as a whole, a form birefringent body which is isotropic in the circumferential direction of the concentric circles and uniform in the radial direction of the concentric circles.

More preferably, in the fifth step in this case, each layer thickness and each layer width of the plurality of the first and second material layers are set according to the wavelength of a bundle of rays incident thereon along the direction of the predetermined axis such that the form birefringent body functions as a quarter wavelength plate with respect to the bundle of rays.

Also, preferably, in the fifth step in this case, each layer thickness and each layer width of the plurality of the first and second material layers are set according to the wavelength of a bundle of rays incident thereon along the direction of the predetermined axis such that the form birefringent body functions as a half wavelength plate with respect to the bundle of rays.

Next, in order to achieve one of the above-mentioned objects, the method of forming a bundle of rays in accordance with the present invention in which a circumferentially isotropic phase plate is used comprises (i) a first step of setting a circumferentially isotropic phase plate into an optical path of a bundle of rays, which phase plate comprises a plurality of first material layers which are formed by a first material on a transparent substrate and disposed in concentric circles around a predetermined axis within a plane orthogonal to an incident direction of the bundle of rays and a plurality of second material layers which are formed by a second material having a refractive index different from that of the first material and disposed in concentric circles around the predetermined axis so as to fill a space between the plurality of the first material layers, wherein the plurality of the first and second material layers are formed such that each layer thickness along the incident direction of the bundle of rays becomes uniform along a circumferential direction of the concentric circles, thereby constituting, as a whole, a form birefringent body; and (ii) a second step of transmitting through the phase plate a bundle of rays having a uniform polarization state within a plane orthogonal to the incident direction with respect to the phase plate so as to form, as elliptically polarized light in which at least one of ellipticity and principal-axis azimuth continuously changes along a circumferential direction of the concentric circles of the phase plate, a bundle of rays having a polarization distribution which changes according to the circumferential direction of the concentric circles of the phase plate.

Here, desirably in the method of forming a bundle of rays in accordance with the present invention, set into the optical path of the bundle of rays in the first step is the phase plate in which the plurality of the first and second material layers are formed such that each layer thickness along the incident direction of the bundle of rays further becomes uniform along a radial direction of the concentric circles, while each layer width along the radial direction of the concentric circles is made constant for each of the first and second material layers at any circular portion of the concentric circles, thereby constituting, as a whole, a form birefringent body which is isotropic in the circumferential direction of the concentric circles and uniform in the radial direction of the concentric circles; whereas formed in the second step is a bundle of rays having a polarization distribution which changes according to the circumferential direction of the concentric circles of the phase plate while being uniform according to the radial direction of the concentric circles.

More preferably, in this case, set into the optical path of the bundle of rays in the first step is the phase plate in which each layer thickness and each layer width of the plurality of the first and second material layers are set according to the wavelength of the bundle of rays such that the form birefringent body functions as a quarter wavelength plate with respect to the bundle of rays, while linearly polarized light or circularly polarized light is used as the bundle of rays made incident on the phase plate in the second step. In this case, the bundle of rays transmitted through the phase plate has a polarization distribution of elliptically polarized light in which principal-axis azimuth and ellipticity continuously change according to the circumferential direction of the concentric circles of the phase plate.

More preferably, in this case, set into the optical path of the bundle of rays in the first step is the phase plate in which each layer thickness and each layer width of the plurality of the first and second material layers are set according to the wavelength of the bundle of rays such that the form birefringent body functions as a half wavelength plate with respect to the bundle of rays, while linearly polarized light is used as the bundle of rays made incident on the phase plate in the second step. In this case, the bundle of rays transmitted through the phase plate has a polarization distribution of linearly polarized light in which principal-axis azimuth, i.e., vibrating direction, continuously changes according to the circumferential direction of the concentric circles of the phase plate, with an ellipticity of zero.

Next, in order to achieve one of the above-mentioned objects, the polarization measuring apparatus equipped with a circumferentially isotropic phase plate in accordance with the present invention comprises (i) a stationary polarization optical system which is spatially fixed and includes a radial phase plate whose azimuth of optic axis is radially disposed around an optical axis of the apparatus; and (ii) a rotary polarizing device which is disposed upstream or downstream of the polarization optical system and is supported so as to be rotatable around the optical axis of the apparatus, wherein, in a state where a bundle of rays to be measured is made incident on the stationary polarization optical system and the rotary polarizing device while the rotary polarizing device is rotated, when, of the bundle of rays transmitted through both the stationary polarization optical system and rotary polarizing device, any of the circumferential directions around the optical axis of the apparatus attains an extinction state, the polarization state of the bundle of rays being incident on the stationary polarization optical system and the rotary polarizing device is measured according to the direction of the optic axis of the rotary polarizing device and the direction of the extinction state.

Since only one rotary polarizing device is rotated around the optical axis of the apparatus, such a polarization measuring apparatus can easily measure the polarization state of elliptically polarized light in a short time.

Preferably, in the polarization measuring apparatus of the present invention, the stationary polarization optical system includes a radial quarter wavelength plate as the radial phase plate, while the rotary polarizing device is a polarizing plate disposed on the light-emitting side of the radial quarter wavelength plate.

Also, preferably in the polarization measuring apparatus of the present invention, the rotary polarizing device is a normal quarter wavelength plate whose azimuth of optic axis is disposed in the same direction at any portion thereof, while the stationary polarization optical system includes, as the radial phase plate, a radial half wavelength plate disposed on the light-emitting side of the normal quarter wavelength plate and a polarizing plate disposed on the light-emitting side of the radial half wavelength plate.

Further, preferably in the polarization measuring apparatus of the present invention, the radial phase plate comprises a plurality of first material layers which are formed by a first material on a transparent substrate and disposed in concentric surface around a predetermined axis within a plane orthogonal to an incident direction of the bundle of rays and a plurality of second material layers which are formed by a second material having a refractive index different from that of the first material and disposed in concentric circles around the predetermined axis so as to fill a space between a plurality of the first material layers, wherein the plurality of the first and second material layers are formed such that each layer thickness along the incident direction of the bundle of rays becomes uniform along a circumferential direction of the concentric circles, thereby constituting, as a whole, a form birefringent body which is isotropic in the circumferential direction of the concentric circles.

More preferably, the plurality of the first and second material layers in the radial phase plate are formed such that each layer thickness along the incident direction of the bundle of rays further becomes uniform along a radial direction of the concentric circles, while each layer width along the radial direction of the concentric circles is made constant for each of the first and second material layers at any circular portion of the concentric circles, thereby constituting, as a whole, a form birefringent body which is isotropic in the circumferential direction of the concentric circles and uniform in the radial direction of the concentric circles.

Desirably, in this case, each layer thickness and each layer width of the plurality of the first and second material layers in the radial phase plate are set according to the wavelength of the bundle of rays such that the form birefringent body functions as a quarter wavelength plate with respect to the bundle of rays.

Here, more desirably, by using a common layer thickness $t$ for the plurality of the first and second material layers, each layer width $t_1$ and refractive index $n_1$ of the plurality of the first material layers, each layer width $t_2$ and refractive index $n_2$ of the plurality of the second material layers, and a constant m which is zero or a natural number, the form birefringent body in the radial phase plate is formed so as to satisfy the following group of expressions:

$t=(2m+1)\lambda/[4(n_0-n_e)]$,
$n_0^2=f_1n_1^2+f_2n_2^2$,
$n_e^2=n_1^2n_2^2/(f_1n_2^2+f_2n_1^2)$,
$f_1=t_1/(t_1+t_2)$, and
$f_2=t_2/(t_1+t_2)$.

Desirably, in this case, each layer thickness and each layer width of the plurality of the first and second material layers in the radial phase plate are set according to the wavelength of the bundle of rays such that the form birefringent body functions as a half wavelength plate with respect to the bundle of rays.

Here, more desirably, by using a common layer thickness t for the plurality of the first and second material layers, each layer width $t_1$ and refractive index $n_1$ of the plurality of the first material layers, each layer width $t_2$ and refractive index $n_2$ of the plurality of the second material layers, and a constant n which is zero or a natural number, the form birefringent body in the radial phase plate is formed so as to satisfy the following group of expressions:

$t=(2n+1)\lambda/[2(n_0-n_e)]$,
$n_0^2=f_1n_1^2+f_2n_2^2$,
$n_e^2=n_1^2n_2^2/(f_1n_2^2+f_2n_1^2)$,
$f_1=t_1/(t_1+t_2)$, and
$f_2=t_2/(t_1+t_2)$.

Next, in order to achieve one of the above-mentioned objects, the polarization measuring method using a circumferentially isotropic phase plate in accordance with the present invention comprises (i) a first step of making a bundle of rays to be measured incident on a stationary polarization optical system which is spatially fixed and includes a radial phase plate whose azimuth of optic axis is radially disposed around an optical axis of the apparatus and a rotary polarizing device which is disposed upstream or downstream of the polarization optical system and is supported so as to be rotatable around the optical axis of the apparatus; (ii) a second step of rotating the rotary polarizing device around the optical axis of the apparatus so as to make, of the bundle of rays transmitted through both the stationary polarization optical system and the rotary polarizing device, any of circumferential directions around the optical axis of the apparatus attain an extinction state; and (iii) a third step of measuring, based on the direction of the optic axis of the rotary polarizing device and the direction of the extinction state of the bundle of rays, the polarization state of the bundle of rays being incident on the stationary polarization optical system and the rotary polarizing device.

Here, preferably in the polarization measuring method of the present invention, in the first step, the bundle of rays to be measured is successively transmitted through the stationary polarization optical system including, as the radial phase plate, a radial quarter wavelength plate, and a polarizing plate which is the rotary polarizing device.

Also, preferably in the polarization measuring method of the present invention, in the first step, the bundle of rays to be measured is successively transmitted through a normal quarter wavelength plate whose azimuth of optic axis is disposed in the same direction at any portion thereof as the rotary polarizing device, a radial half wavelength plate which is included in the stationary polarization optical system as the radial phase plate, and a phase plate included in the stationary polarization optical system.

Further, preferably in the polarization measuring method of the present invention, set into the optical path of the bundle of rays in the first step is a circumferentially isotropic radial phase plate comprising a plurality of first material layers which are formed by a first material on a transparent substrate and disposed in concentric circles around a predetermined axis within a plane orthogonal to an incident direction of the bundle of rays and a plurality of second material layers which are formed by a second material having a refractive index different from that of the first material and disposed in concentric circles around the predetermined axis so as to fill a space between a plurality of the first material layers, wherein the plurality of the first and second material layers are formed such that each layer thickness along the incident direction of the bundle of rays becomes uniform along a circumferential direction of the concentric circles, thereby constituting, as a whole, a form birefringent body which is isotropic in the circumferential direction of the concentric circles.

Also, more preferably, set into the optical path of the bundle of rays in the first step is the radial phase plate in which the plurality of the first and second material layers are formed such that each layer thickness along the incident direction of the bundle of rays further becomes uniform along a radial direction of the concentric circles, while each layer width along the radial direction of the concentric circles is made constant for each of the first and second material layers at any circular portion of the concentric circles, thereby constituting, as a whole, a form birefringent body which is isotropic in the circumferential direction of the concentric circles and uniform in the radial direction of the concentric circles.

Desirably, in this case, set into the optical path of the bundle of rays in the first step is the radial phase plate in which each layer thickness and each layer width of the plurality of the first and second material layers are set according to the wavelength of the bundle of rays such that the form birefringent body functions as a quarter wavelength plate with respect to the bundle of rays.

Also, desirably, in this case, set into the optical path of the bundle of rays in the first step is the radial phase plate in which each layer thickness and each layer width of the plurality of the first and second material layers are set according to the wavelength of the bundle of rays such that the form birefringent body functions as a half wavelength plate with respect to the bundle of rays.

In the following, the principle of the present invention will be explained. When planar first material layers 1 each having a refractive index $n_1$ and a layer width $t_1$ and planar second material layers 2 each having a refractive index $n_2$ and a layer width $t_2$ are alternately arranged with a regularity to form a structure as shown in FIG. 1, this structure becomes a form birefringent body. This form birefringent body yields an effect which is equivalent to that of a uniaxial crystal having an optic axis (retarded-phase axis or advanced-phase axis) perpendicular to the interface between the two material layers 1 and 2.

It has been well known that, in this structure, an effective refractive index $n_0$ with respect to light in which electric vector vibrates in parallel to the interface and an effective refractive index $n_e$ with respect to light in which electric vector vibrates perpendicularly to the interface are represented by the following expressions (1) and (2). This knowledge is disclosed in detail in a book such as M. Born and E. Wolf, *Principles of Optics*, 3rd ed., (Pergamon Press), pp. 705–708.

$$n_o^2 = f_1 n_1^2 + f_2 n_2^2 \quad (1)$$

$$n_e^2 = \frac{n_1^2 n_2^2}{f_1 n_2^2 + f_2 n_1^2} \quad (2)$$

wherein $$f_1 = t_1/(t_1+t_2) \quad (3)$$

$$f_2 = t_2/(t_1+t_2) \quad (4)$$

Here, when each layer thickness t of the first and second layers 1 and 2 along the direction of a bundle of rays incident on and transmitted through the form birefringent body as shown in FIG. 1 is made to coincide with $t_{QWP}$ given by the following expression (5), for example, a quarter wavelength plate is obtained as the form birefringent body. Also, when the layer thickness t of the first and second layers 1 and 2 along the direction of a bundle of rays incident on and transmitted through the form birefringent body is made to coincide with $t_{HWP}$ given by the following expression (6), for example, a half wavelength plate is obtained as the form birefringent body.

The characteristic features of such a form birefringent body as compared with birefringent $$t_{QWP} = \frac{(2m+1)\lambda}{4(n_o - n_e)}, \quad m = 0,1,2,\ldots \quad (5)$$

$$t_{HWP} = \frac{(2n+1)\lambda}{4(n_o - n_e)}, \quad n = 0,1,2,\ldots \quad (6)$$

crystals such as mica, calcite, and rock crystal lie in the following two points:

(I) When ratios (layer width ratios) $f_1$ and $f_2$ are appropriately selected, effective refractive indices $n_0$ and $n_e$ can be arbitrarily selected.

(II) When the interface between the first and second material layers is changed with a curvature which is sufficiently gentle as compared with the wavelength $\lambda$ of the bundle of rays, a spatial distribution can be rendered to the optic axis.

Based on utilization of feature (II), the inventor of the present invention has found that a phase plate whose optic axis changes spatially can be realized. Accordingly, elliptically polarized light whose ellipticity and principal-axis azimuth continuously change, linearly polarized light whose vibrating direction continuously changes, and the like can be obtained.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
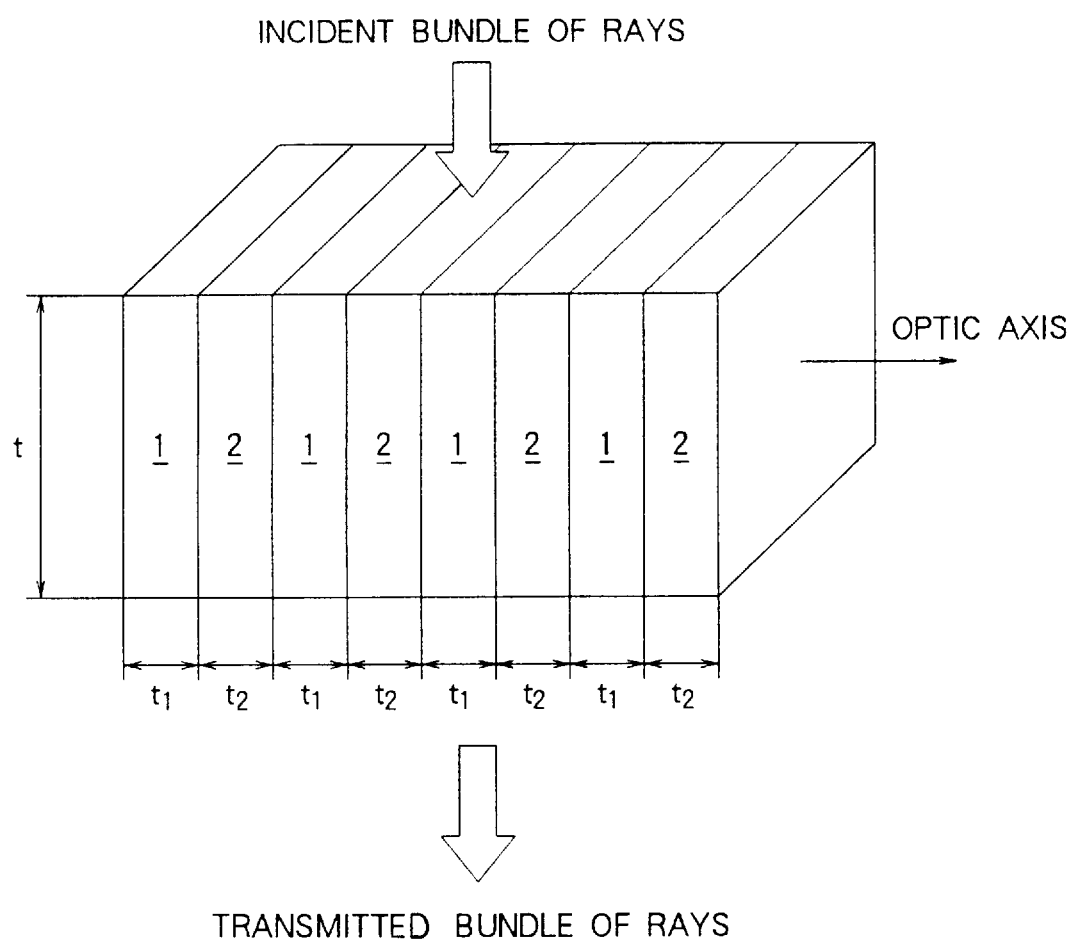
FIG. 1 is a perspective view showing, with a magnification, a configuration of a form birefringent body for explaining the principle of the present invention.

In the following, configurations and operations of various embodiments concerning the circumferentially isotropic phase plate in accordance with the present invention and the polarization measuring apparatus equipped with this phase plate will be explained in detail with reference to FIGS. 2A to 13. Here, in the explanation of the drawings, constituents identical to each other will be referred to with marks identical to each other without their overlapping explanations repeated. Also, ratios of sizes in the drawings do not always correspond to those explained.

First Embodiment

Figure 2A:
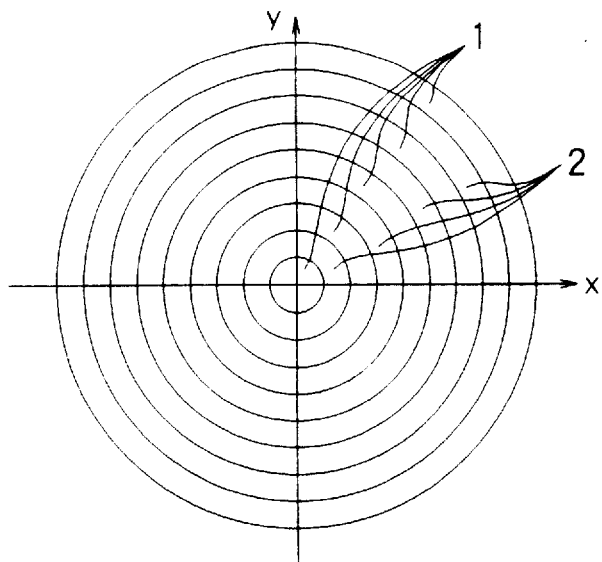
FIG. 2A is a plan view showing, with a magnification, a configuration of a phase plate in accordance with a first embodiment of the present invention.
Figure 2B:
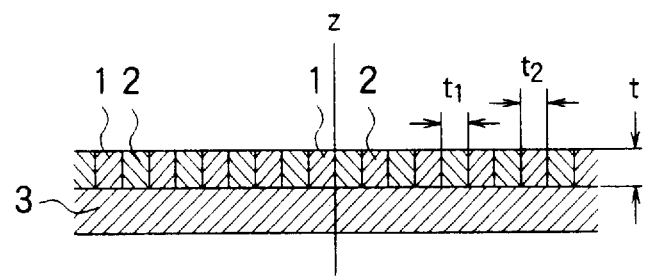
FIG. 2B is a cross-sectional view showing, with a magnification, a configuration of the phase plate of FIG. 2A along its radial direction.

As shown in FIGS. 2A and 2B, in the phase plate of this embodiment, first material layers 1 and second material layers 2 are alternately disposed on a transparent substrate 3 so as to form a form birefringent body. Also, these material layers 1 and 2 are disposed such that boundaries therebetween become concentric. Namely, this structure is formed as a concentric form birefringent body.

Here, radius $r_n$ of the n-th concentric interface positioned between the first material layer 1 having a refractive index $n_1$ and a layer width $t_1$ and the second material layer 2 having a refractive index $n_2$ and a layer width $t_2$ is represented by the following expressions (7) and (8).

When n is an odd number:

$$r_n = m(t_1+t_2)+t_1 \qquad (7)$$

wherein n=2m+1, and m=0, 1, 2, . . .

When n is an even number:

$$r_n = m(t_1+t_2) \qquad (8)$$

wherein n=2m, and m=1, 2, 3, . . .

Here, the respective refractive indices $n_1$ and $n_2$ of the material layers 1 and 2 must satisfy $n_1 \neq n_2$. The respective layer width values $t_1$ and $t_2$ of the material layers 1 and 2 may be either $t_1=t_2$ or $t_1 \neq t_2$. Further, though the material layer 1 disposed at the center portion of the concentric circles of the first and second material layers 1 and 2 has a radius of $t_1$ according to the above two expressions (7) and (8), it may have a diameter of $t_1$. Namely, since the center portion of the concentric circles becomes a singular point, it is not necessary for the two expressions (7) and (8) to be strictly established there.

When each layer thickness t of the first and second material layers 1 and 2 as the layer thickness of the concentric form birefringent body, as shown in FIG. 2B, is set to $t_{QWP}$ or $t_{HWP}$ based on the above expression (5) or (6), a quarter wavelength plate or half wavelength plate having desirable effective refractive indices $n_0$ and $n_e$ can be formed.

Figure 3:
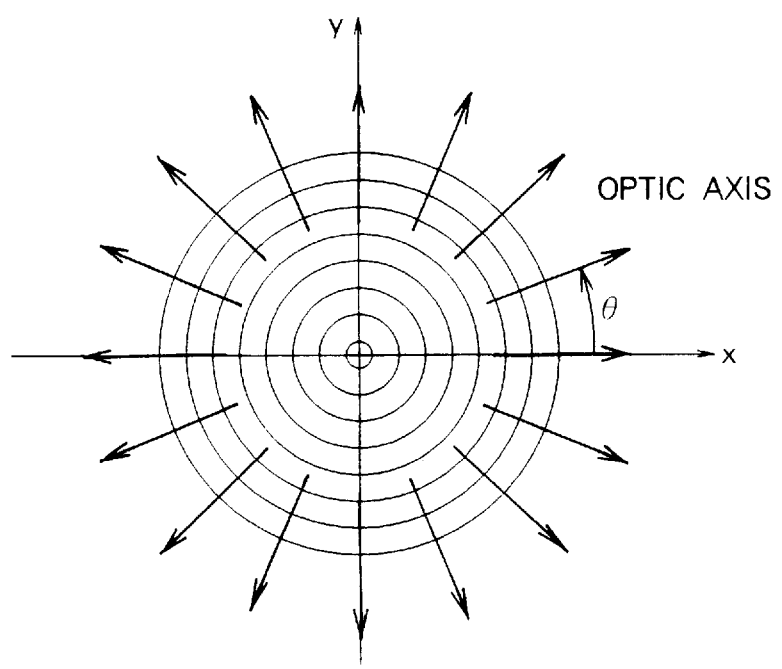
FIG. 3 is a plan view showing an azimuth distribution of optic axis in the phase plate of FIG. 2A.

As shown in FIG. 3, since each optic axis of these quarter wavelength plate and half wavelength plate coincides with the normal direction of the interface between the material layers 1 and 2, it radially extends from the center axis of each concentric interface. Namely, the optic-axis azimuth is set so as to continuously change on a plane perpendicular to the center axis of the concentric circles.

Here, when the ratio $t_1/t_2$ of the respective layer width values $t_1$ and $t_2$ of the first and second material layers 1 and 2 is changed, the effective refractive indices $n_0$ and $n_e$ of the concentric form birefringent body change based on the above four expressions (1) to (4), whereby the phase modulation amount (retarded phase amount or advanced phase amount) of the concentric form birefringent body changes based on the above two expressions (5) and (6). According to the above two expressions (5) and (6), it is clear that the phase modulation amount of the concentric form birefringent body also changes when the common layer thickness t of the first and second material layers 1 and 2 is altered.

Here, as first and second materials respectively constituting the first and second material layers 1 and 2, thin layer materials such as $SiO_2$, $MgF_2$, and $Al_2O_3$ are preferably used. Preferably, the respective layer width values $t_1$ and $t_2$ have an order of about 0.1 $\mu$m.

In the following, a method of making a phase plate such as quarter wavelength plate or half wavelength plate using such a concentric form birefringent body will be explained.

Figure 4A:
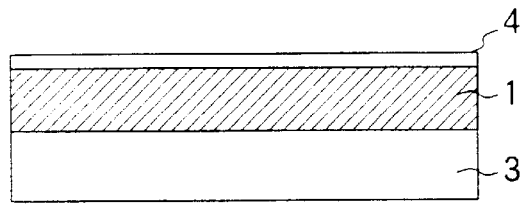
FIGS. 4A to 4D are cross-sectional views successively showing steps for making the phase plate of FIG. 2A.

Initially, as shown in FIG. 4A, a film-depositing apparatus such as sputtering system is used to deposit the first material on the transparent substrate 3, thereby forming the first material layer 1 having a desired thickness. Thereafter, onto the surface of the first material layer 1, a resist layer 4 which exhibits a high sensitivity to an EB (electron beam) is applied.

Figure 4B:
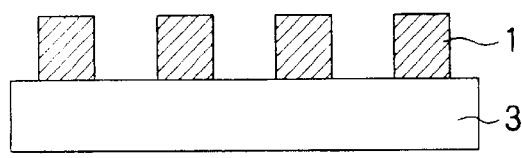

Subsequently, as shown in FIG. 4B, an EB drawing apparatus or the like is used to draw a plurality of concentric boundaries on the surface of the resist layer 4, which is then subjected to a development processing. Thereafter, an etching apparatus based on RIE (Reactive Ion Etching) technique or the like is used to etch out parts of the first material layer 1 which correspond to a plurality of ring regions alternately positioned from the center portion of the concentric circles drawn on the resist layer 4. Then, the resist layers 4 respectively covering the remaining plurality of the first material layers 1 are eliminated.

Figure 4C:
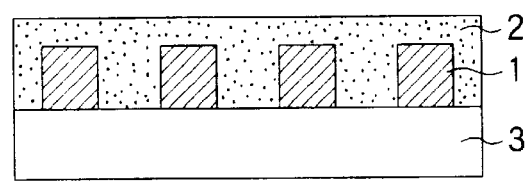

Next, as shown in FIG. 4C, the sputtering apparatus or the like is used again to deposit the second material on the transparent substrate 3 and the plurality of the first material layers 1, thereby forming the second material layer 2 with a layer thickness which covers the plurality of the first material layers 1. At this time, spaces between the plurality of the first material layers 1 are filled with the second material layer 2.

Figure 4D:
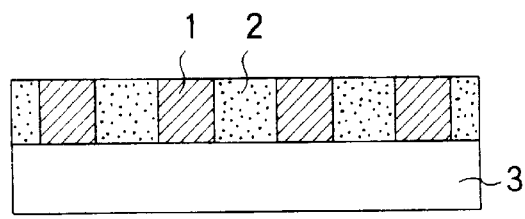

Finally, as shown in FIG. 4D, a grinding apparatus or the like is used to polish the first and second material layers 1 and 2 to form a desired layer thickness distribution on the transparent substrate 3. At this time, when each layer thickness of the first and second material layers 1 and 2 is adjusted according to the above two expressions (5) and (6), a quarter wavelength plate or half wavelength plate is accomplished.

In the following, explanation will be provided for a method of forming a bundle of rays such as elliptically polarized light whose ellipticity and principal-axis azimuth continuously change or linearly polarized light whose vibrating direction continuously changes as a quarter wavelength plate or half wavelength plate using such a concentric form birefringent body is utilized.

First, in a case where a linearly polarized bundle of rays is incident on a quarter wavelength plate whose optic axis is continuously disposed radially, a polarization distribution of the transmitted bundle of rays will be explained. The transmitted polarization characteristic of a quarter wavelength plate whose optic axis has a radial in-plane distribution as shown in FIG. 3 is represented with a Jones matrix $T_{QWP}$ of $\theta$ direction with reference to x-axis direction in x-y coordinate system by the following expression (9):

$$T_{QWP} = R(-\theta)QR(\theta) \qquad (9)$$

wherein $$Q = \begin{pmatrix} 1 & 0 \\ 0 & i \end{pmatrix}, i: \text{imaginary unit} \qquad (10)$$

$$R(\theta) = \begin{pmatrix} \cos\theta & \sin\theta \\ -\sin\theta & \cos\theta \end{pmatrix} \qquad (11)$$

Here, the Jones matrix $T_{QWP}$ represented by expression (9) is equal to a Jones matrix which is obtained when a normal quarter wavelength plate whose optic-axis azimuth is disposed along the same direction at any position is rotated by an angle of $\theta$ with respect to x-axis.

For example, when a bundle of rays in a polarization state $U_0$ of linearly polarized light vibrating in x-axis direction is incident on this quarter wavelength plate, a polarization state $U_{QWP}(\theta)$ with respect to $\theta$ direction in the bundle of rays transmitted through the quarter wavelength plate is represented by the following expression (12):

$$U_{QWP}(\theta) = T_{QWP}U_0 \qquad (12)$$
$$= R(-\theta)QR(\theta)U_0$$

wherein $$U_0 = \begin{pmatrix} 1 \\ 0 \end{pmatrix} \qquad (13)$$

Here, when the above three expressions (10), (11), and (13) are input into expression (12), the polarization state with respect to $\theta$ direction in the bundle of rays transmitted through the quarter wavelength plate is represented by the following expression (14):

$$U_{QWP}(\theta) = \begin{pmatrix} \cos^2\theta + i\sin^2\theta \\ (1-i)\sin\theta\cos\theta \end{pmatrix} \qquad (14)$$

According to this expression (14), it can easily be seen that the polarization state becomes linearly polarized light which vibrates in x-axis direction with respect to $\theta=0°$, 90°, 180°, and 270°. Also, it can be easily understood that the polarization state becomes circularly polarized light with respect to $\theta=45°$, 135°, 225°, and 315°. The polarization state in $\theta$ direction corresponding to angles other than those noted above becomes elliptic polarization whose ellipticity and principal-axis azimuth continuously change with respect to angle $\theta$.

Here, the above expression (14) can be rewritten as the following expression (15):

$$U_{QWP}(\theta) = \begin{pmatrix} a_1 e^{i\delta_1} \\ a_2 e^{i\delta_2} \end{pmatrix} \qquad (15)$$

wherein $a_1 = (\cos^4\theta + \sin^4\theta)^{1/2}$ \hfill (16)

$\delta_1 = \tan^{-1}\theta(\tan^2\theta)$ \hfill (17)

$a_2 = (2\cos^2\theta\sin^2\theta)^{1/2}$ \hfill (18)

$\delta_2 = -\pi/4$ \hfill (19)

In this case, principal-axis azimuth $\Psi$ and ellipticity X of elliptically polarized light are represented by the following expressions (20) to (23):

$\tan 2\Psi = \tan(2\alpha)\cos\delta$ \hfill (20)

$\sin 2X = -\sin(2\alpha)\sin\delta$ \hfill (21)

$\tan \alpha = a_2/a_1$ \hfill (22)

$\delta = \delta_2 - \delta_1$ \hfill (23)

Figure 5A:
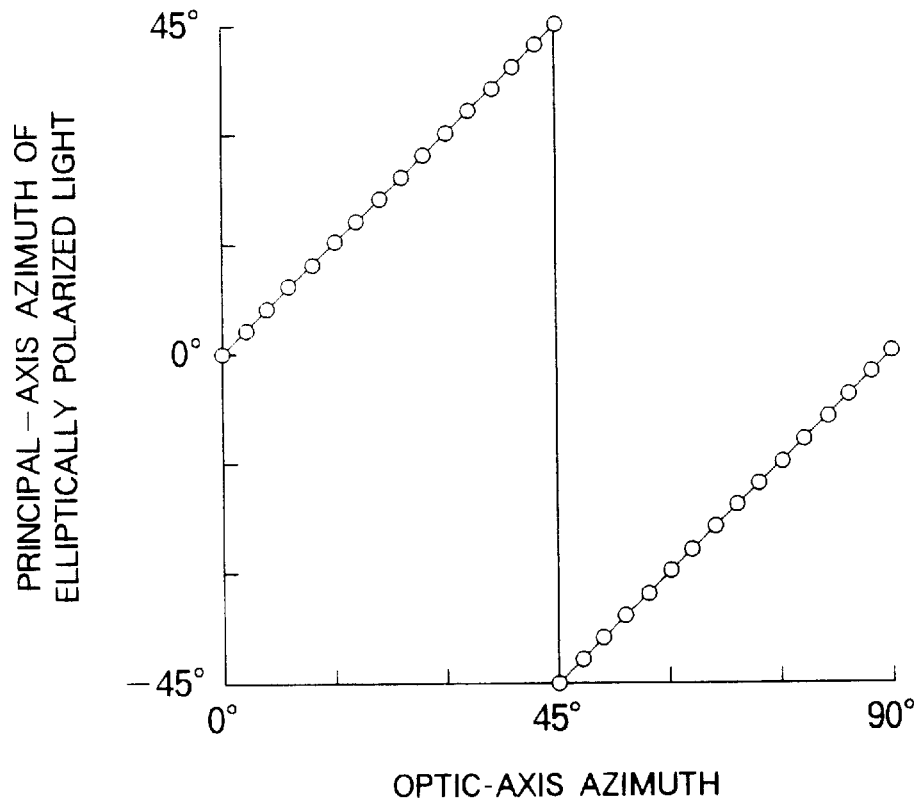
FIG. 5A is a graph showing, in a case where a linearly polarized bundle of rays is made incident on a quarter wavelength plate formed as the phase plate of FIG. 2A, a result of calculation of the principal-axis azimuth of elliptically polarized light in the transmitted bundle of rays.
Figure 5B:
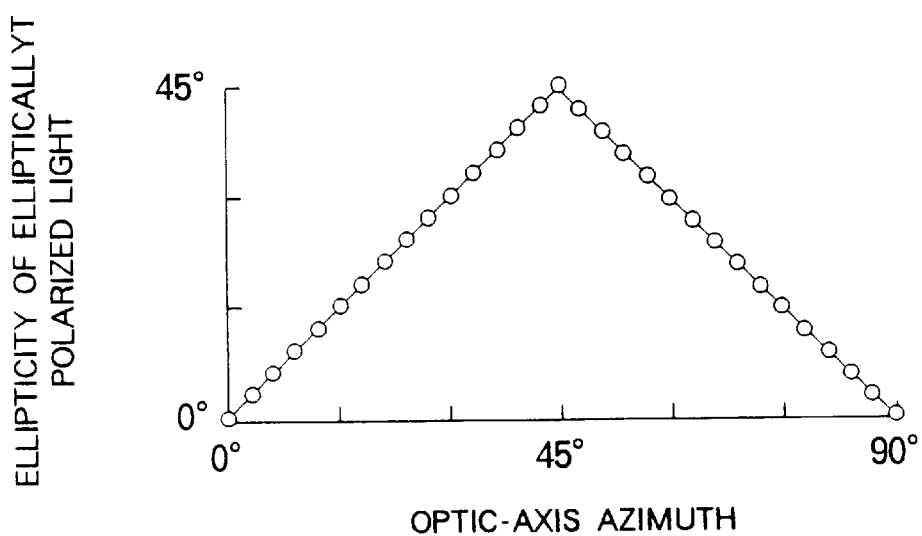
FIG. 5B is a graph showing a result of calculation of the ellipticity of elliptically polarized light in the transmitted bundle of rays in a case similar to FIG. 5A.
Figure 6:
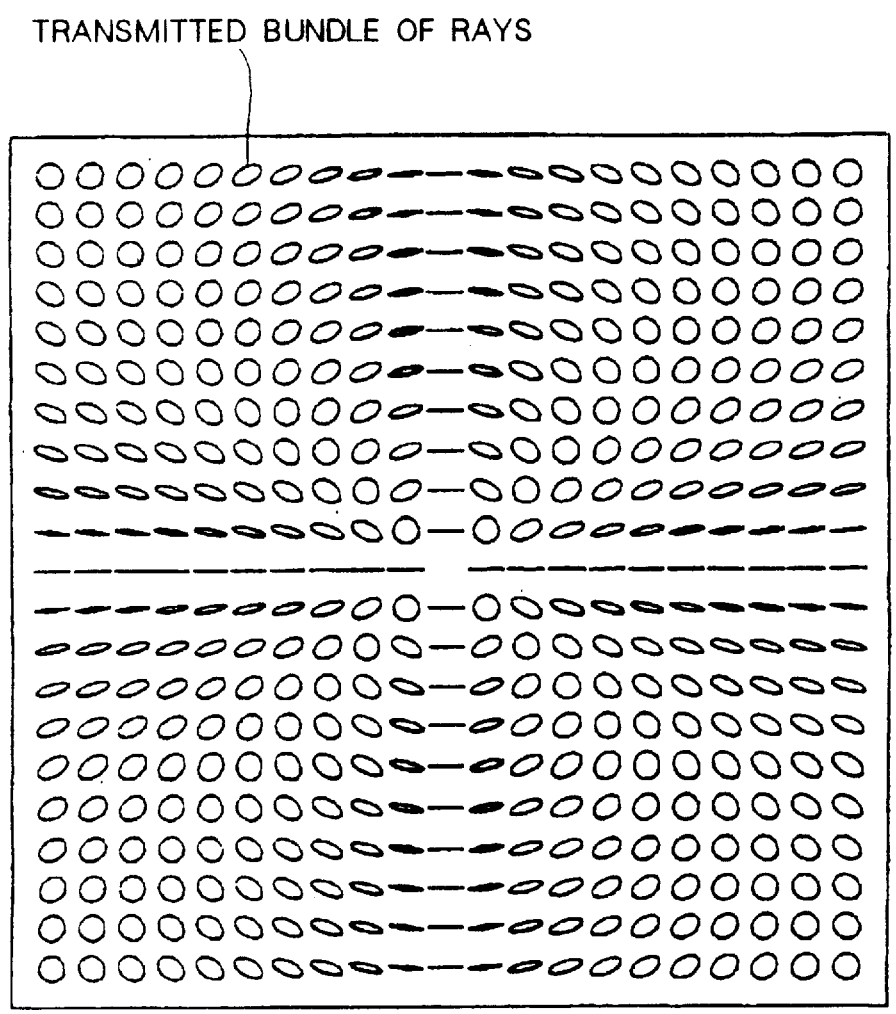
FIG. 6 is a plan view showing a polarization distribution of the transmitted bundle of rays in a case similar to FIG. 5A.

FIGS. 5A and 5B respectively show results of calculations of the principal-axis azimuth $\Psi$ and ellipticity X of elliptically polarized light based on these four expressions (20) to (23) in the bundle of rays transmitted through the quarter wavelength plate. FIG. 6 shows a result of calculation of a polarization distribution in the bundle of rays transmitted through the quarter wavelength plate based on FIGS. 5A and 5B. In view of FIGS. 5A, 5B, and 6, it can be easily seen how a polarization distribution in which the principal-axis azimuth $\Psi$ and ellipticity X of elliptically polarized light continuously change is generated in the transmitted bundle of rays.

Next, in a case where a linearly polarized bundle of rays is incident on a half wavelength plate whose optic axis is continuously disposed radially, a polarization distribution of the transmitted bundle of rays will be explained. The transmitted polarization characteristic of a half wavelength plate whose optic axis has a radial in-plane distribution as shown in FIG. 3 is represented with a Jones matrix $T_{HWP}$ of $\theta$ direction with reference to x-axis direction in x-y coordinate system by the following expression (24):

$$T_{HWP} = R(-\theta)HR(\theta) \qquad (24)$$

wherein $$H = \begin{pmatrix} 1 & 0 \\ 0 & -1 \end{pmatrix} \qquad (25)$$

Here, the Jones matrix $T_{HWP}$ represented by expression (24) is equal to a Jones matrix which is obtained when a normal half wavelength plate whose optic-axis azimuth is disposed along the same direction at any position is rotated by an angle of $\theta$ with respect to x axis.

For example, when a bundle of rays in a polarization state $U_0$ of linearly polarized light vibrating in x-axis direction is incident on this half wavelength plate, a polarization state $U_{HWP}(\theta)$ with respect to $\theta$ direction in the bundle of rays transmitted through the quarter wavelength plate is represented by the following expression (26):

$$U_{HWP}(\theta) = T_{HWP}U_0 \qquad (26)$$
$$= R(-\theta)HR(\theta)U_0$$

Here, when the above three expressions (9), (25), and (13) are input into expression (26), the polarization state with respect to $\theta$ direction in the bundle of rays transmitted through the half wavelength plate is represented by the following expression (27):

$$U_{HWP}(\theta) = \begin{pmatrix} \cos 2\theta \\ \sin 2\theta \end{pmatrix} \qquad (27)$$

This expression (27) represents linearly polarized light whose vibrating direction changes depending on angle $\theta$. Accordingly, angle $\Psi$ which is formed by the vibrating direction of this linearly polarized light with respect to x axis is represented by expression (28) based on the above expression (27).

$\Psi = 2\theta$ \hfill (28)

Figure 7:
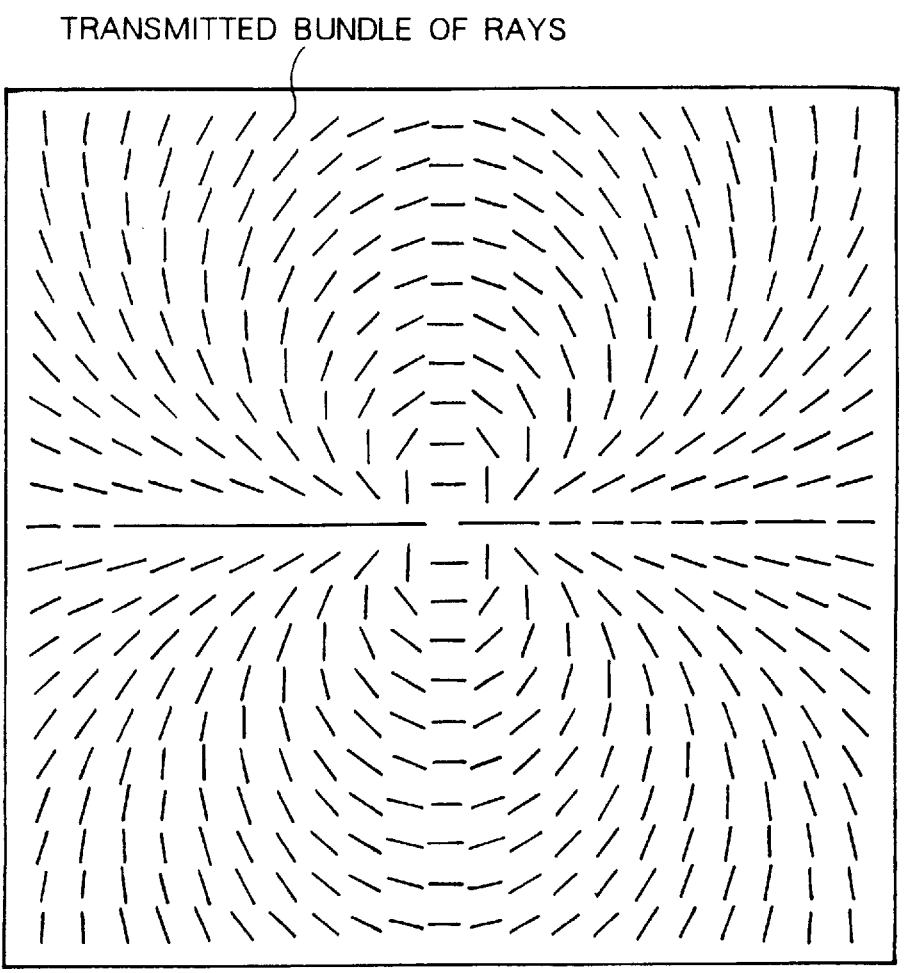
FIG. 7 is a plan view showing, in a case where a linearly polarized bundle of rays is incident on a half wavelength plate formed as the phase plate of FIG. 2A, a vibrating-direction distribution of the linearly polarized light in the transmitted bundle of rays.

Namely, it can be easily seen that the polarization state in $\theta$ direction becomes linearly polarized light whose vibrating direction continuously changes according to angle $\theta$. FIG. 7 shows a result of calculation of a polarization distribution in the bundle of rays transmitted through the half wavelength plate based on this expression (28). In view of FIG. 7, it can be easily understood how a polarization distribution in which the vibrating direction of the linearly polarized light continuously changes is generated in the transmitted bundle of rays.

Figure 8:
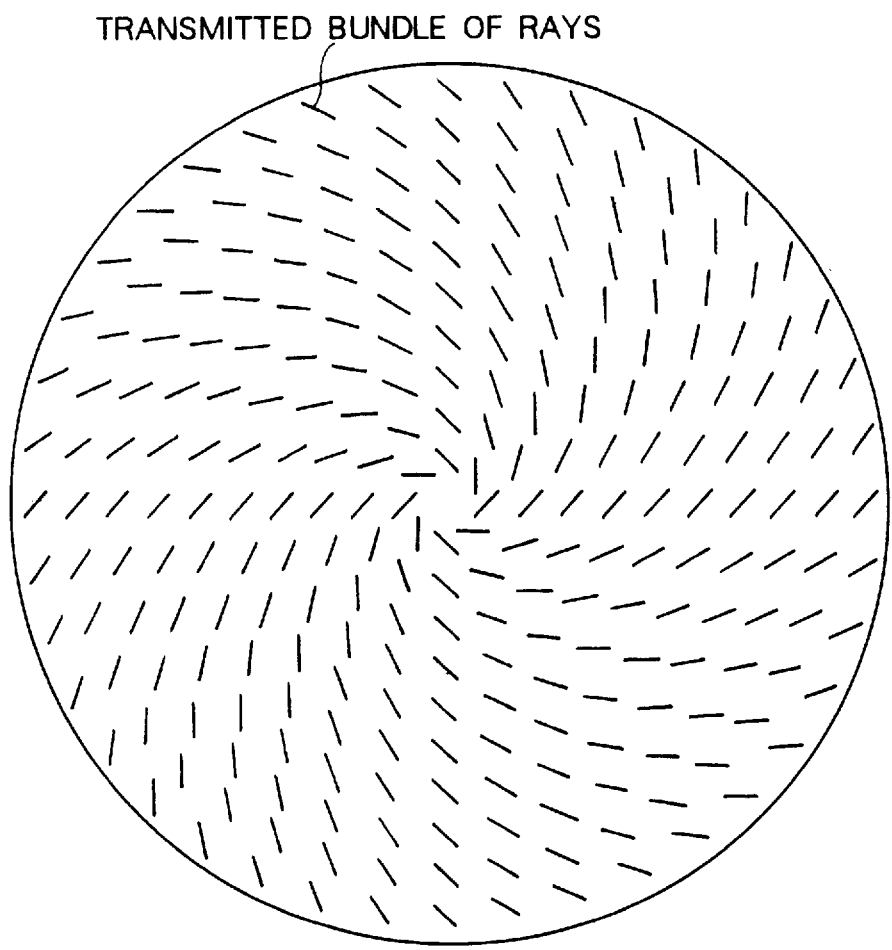
FIG. 8 is a plan view showing, in a case where a circularly polarized bundle of rays is incident on a quarter wavelength plate formed as the phase plate of FIG. 2A, a vibrating-direction distribution of the linearly polarized light in the transmitted bundle of rays.

FIG. 8 shows, in a case where a circularly polarized bundle of rays is incident on a quarter wavelength plate whose optic axis is continuously disposed radially, a result of calculation of a polarization distribution in the transmitted bundle of rays. In view of FIG. 8, it can be easily seen that linearly polarized light whose vibrating direction continuously changes according to angle $\theta$ is obtained in the transmitted bundle of rays.

When a circularly polarized bundle of rays is incident on a half wavelength plate whose optic axis is continuously disposed radially, the transmitted bundle of rays becomes circularly polarized light rotated inversely to the incident bundle of rays. Here, in the case where each layer thickness of the first and second material layers 1 and 2 is slightly changed along the radial direction of the concentric circles or each layer width of the first and second material layers 1 and 2 is slightly changed along the radial direction of the concentric circles to form this half wavelength plate, the phase modulation effect in this half wavelength plate slightly shifts from the half wavelength in the radial direction of the concentric circles while being isotropic in the circumferential direction of the concentric circles so as to coincide with the half wavelength.

Accordingly, when a circularly polarized bundle of rays is incident on this half wavelength plate, obtained is a polarization distribution of the transmitted bundle of rays which is circularly polarized light at the center portion while the peripheral portion is elliptically polarized light slightly deviated from the circularly polarized light. When, as an example of a case where the deviation of phase modulation effect is remarkable, a phase plate is formed such that the phase modulation effect at the center portion is the half wavelength while that at the peripheral portion is the quarter wavelength, obtained in the transmitted bundle of rays is a polarization distribution whose center portion is circularly polarized light rotated inversely to the incident bundle of rays while the peripheral portion is linearly polarized light such as that shown in FIG. 8.

Second Embodiment

Figure 9:
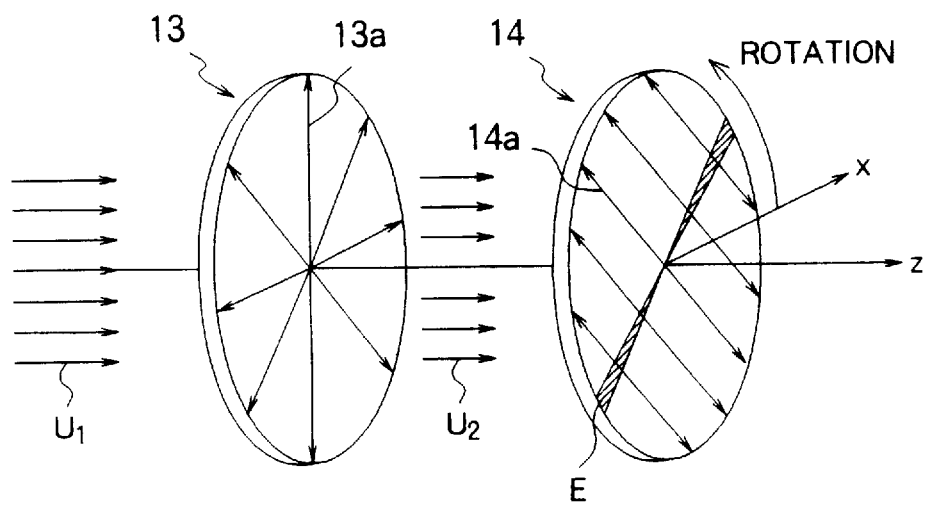
FIG. 9 is a perspective view showing, with a magnification, a configuration of a polarization measuring apparatus in accordance with a second embodiment of the present invention.

As shown in FIG. 9, in the polarization measuring apparatus of this embodiment, a radial quarter wavelength plate 13 and a polarizing plate 14 are successively disposed along an optical axis of the apparatus as viewed from the light-inlet side. The radial quarter wavelength plate 13 is formed as a concentric form birefringent body similar to the phase plate of the above-mentioned first embodiment and disposed such that the azimuth of its optic axis 13a is radially set around the optical axis of the apparatus within a plane perpendicular to the optical axis of the apparatus. Also, the polarizing plate 14 is formed as a normal analyzer and disposed such that the azimuth of its transmission axis 14a is set along the same direction at any position within a plane perpendicular to the optical axis of the apparatus.

Here, the radial quarter wavelength plate 13 is disposed as being spatially fixed. By contrast, the polarizing plate 14 is disposed so as to be rotatable around the optical axis of the apparatus. Also, in x-y-z coordinate system, z axis is set so as to coincide with the optical axis of the apparatus, whereas x-y plane is set so as to be perpendicular to the optical axis of the apparatus. Accordingly, the radial quarter wavelength plate 13 and the polarizing plate 14 are disposed within x-y planes such that the optical axis of the apparatus passes through their respective center portions.

In the following, the principle of operation of such a polarization measuring apparatus will be explained.

In the radial quarter wavelength plate 13, the azimuth of the optic axis 13a is disposed radially within an x-y plane orthogonal to the optical axis z. Accordingly, the transmitted polarization characteristic in a portion positioned in θ direction with reference to x-axis direction is represented with a Jones matrix $T_{QWP}$ by the above expression (9).

A polarization state $U_1(\Psi, X)$ of an elliptically polarized bundle of rays having a principal-axis azimuth which forms an angle of $\Psi$ with respect to x-axis direction within the x-y plane and an ellipticity forming an angle of X with respect to this principal-axis azimuth is represented by the following expression (29):

$$U_1(\Psi, X) = R(-\Psi)U_0' \tag{29}$$

Here, according to a Jones vector notation based on x'-y' coordinate system set as x' axis is selected along the direction of the principal-axis azimuth $\Psi$, the bundle of rays $U_0'$ is represented by the following expression (30):
When the bundle of rays in this polarization state $$U_0' = \begin{pmatrix} \cos X \\ -i \sin X \end{pmatrix}, \, i\text{: imaginary unit} \tag{30}$$

$U_1(\Psi, X)$ is incident on the radial quarter wavelength plate 13, a polarization state $U_2(\Psi, X)$ with respect to θ direction in the bundle of rays transmitted through this radial quarter wavelength plate 13 is expressed by the following expression (31) by use of the above expression (9).

$$\begin{aligned} U_2(\Psi, X) &= T_{QWP}U_1(\Psi, X) \\ &= R(-\theta)QR(\theta)R(-\Psi)U_0' \end{aligned} \tag{31}$$

Here, in the case where the polarization state with respect to (θ=Ψ) direction of the bundle of rays transmitted through the radial quarter wavelength plate 13 is taken into consideration and represented by $U_{2L}(\Psi, X)$, when the fact that $R(\Psi)R(-\Psi)$ becomes a unit matrix is utilized to input the above three expressions (10), (11), and (30) into expression (31), the polarization state $U_{2L}(\Psi, X)$ with respect to (θ=Ψ) direction is represented by the following expression (32):

$$\begin{aligned} U_{2L}(\Psi, X) &= R(-\Psi)QU_0' \\ &= \begin{pmatrix} \cos(\Psi + X) \\ \sin(\Psi + X) \end{pmatrix} \end{aligned} \tag{32}$$

Figure 10A:
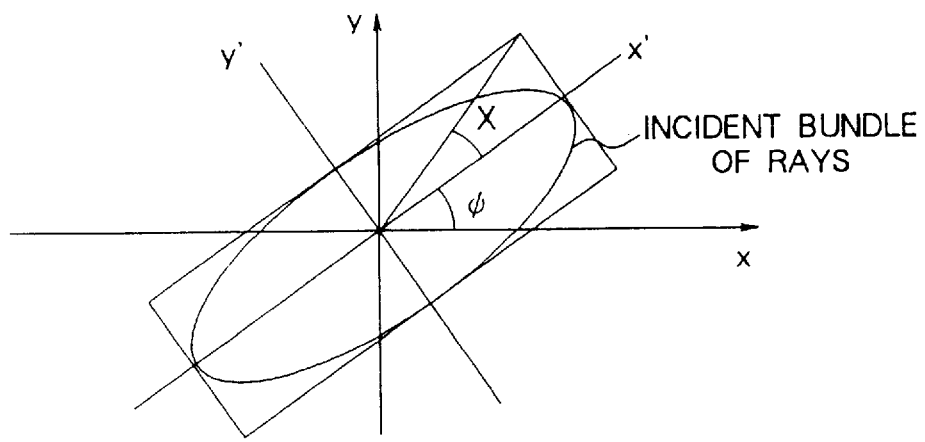
FIG. 10A is a cross-sectional view showing a polarization state of elliptically polarized light incident on a quarter wavelength plate in the polarization measuring apparatus of FIG. 9.
Figure 10B:
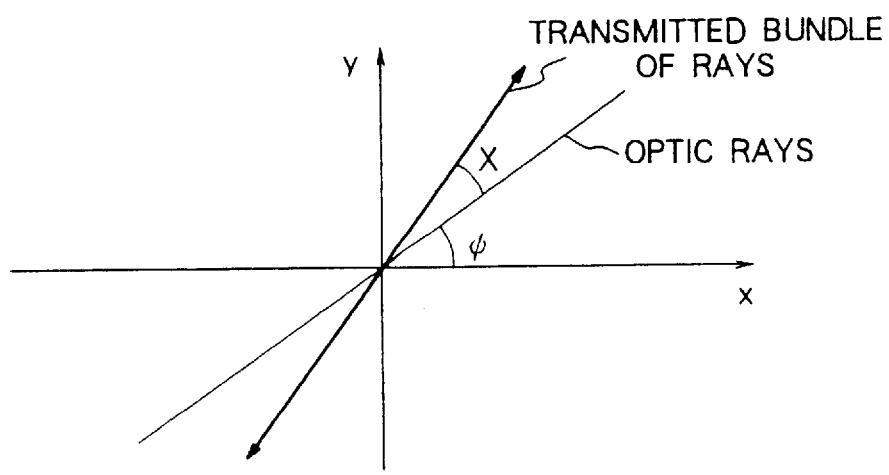
FIG. 10B a cross-sectional view showing a polarization state in ($\theta = \Psi$) direction of the bundle of rays of FIG. 10A transmitted through the quarter wavelength plate in the polarization measuring apparatus of FIG. 9.

As shown in FIG. 10B, it can be seen from expression (32) that the polarization state $U_{2L}(\Psi, X)$ with respect to (θ=Ψ) direction becomes linearly polarized light whose vibrating direction coincides with an angle (Ψ+X) with reference to x-axis direction. Accordingly, when the transmission axis 14a of the analyzer 14 is set to an azimuth which is orthogonal to the angle (Ψ+X), an extinction state in (θ=Ψ) direction can be realized.

Figure 11:
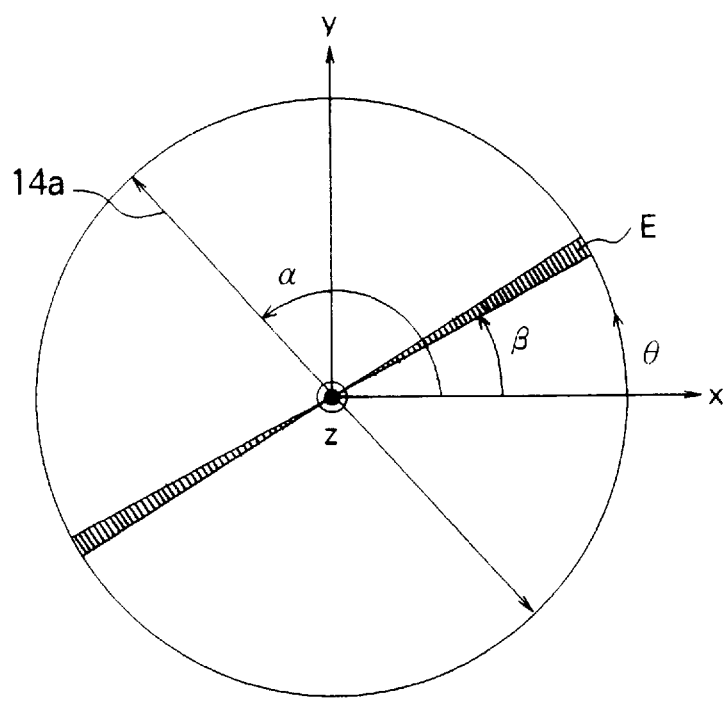
FIG. 11 is a plan view showing a transmission axis of a polarizing plate and an extinction azimuth as viewed from the light-emitting side of the polarization measuring apparatus of FIG. 9.

Namely, in the analyzer 14 which is in the extinction state as shown in FIG. 11, a relationship represented by the following expressions (33) and (34) is established between an azimuth angle α of the transmission axis 14a and an azimuth angle β of extinction E.

$$\alpha = \Psi + X + \pi/2 \tag{33}$$

$$\beta = \Psi \tag{34}$$

Accordingly, the principal-axis azimuth Ψ and ellipticity X of the elliptically polarized bundle of rays $U_1(\Psi, X)$ which is incident on this polarization measuring apparatus can be determined as being calculated according to the following expressions (35) and (36) by use of the azimuth angle α of the transmission axis 14a and the azimuth angle β of extinction E.

$$\Psi = \beta \tag{35}$$

$$X = \alpha - \beta - \pi/2 \tag{36}$$

In this embodiment, since the polarizing device rotated around the optical axis of the apparatus is the analyzer 14 alone, and no trial-and-error operation is necessary for adjusting the transmission axis 14a of the analyzer 14, the polarization state of elliptically polarized light can be easily measured in a short time.

Namely, in this embodiment, extinction which has been effected in the whole region in the circumferential direction around the optical axis z according to the conventional Senarmont method is effected only in a specific azimuth in the circumferential direction, thereby using this specific azimuth of extinction as data. Accordingly, the number of polarizing devices, which are rotatable members, can be reduced to one, while trial-and-error measuring operations can be eliminated.

Third Embodiment

Figure 12:
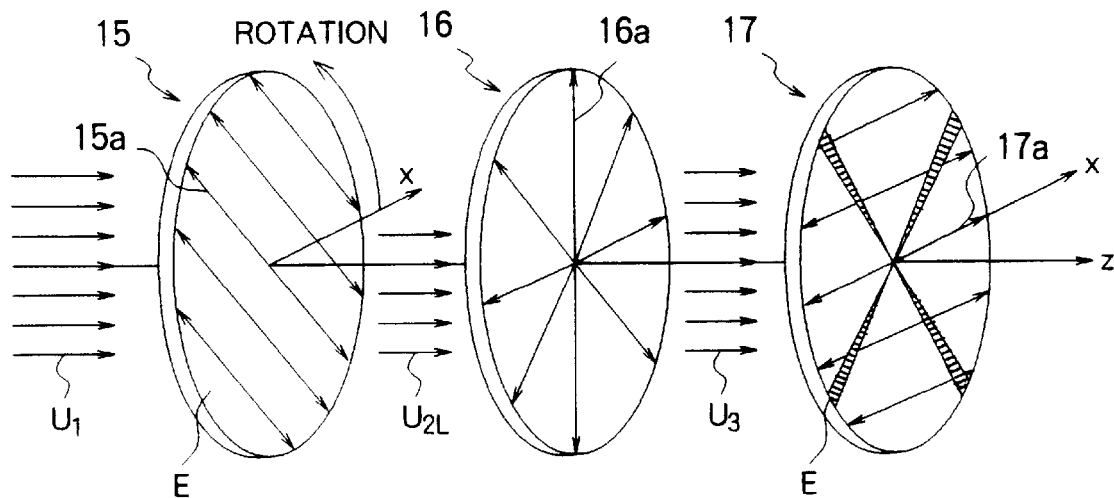
FIG. 12 is a perspective view showing, with a magnification, a configuration of a polarization measuring apparatus in accordance with a third embodiment of the present invention.

As shown in FIG. 12, in the polarization measuring apparatus of this embodiment, a normal quarter wavelength plate 15, a radial half wavelength plate 16, and a polarizing plate 17 are successively disposed along an optical axis of the apparatus as viewed from the light-inlet side. The normal quarter wavelength plate 15 is formed as a normal quarter wavelength plate which is disposed such that the azimuth of its optic axis 15a is set along the same direction at any position within a plane perpendicular to the optical axis of the apparatus. Also, the radial half wavelength plate 16 is formed as a concentric form birefringent body similar to the phase plate of the above-mentioned first embodiment and disposed such that the azimuth of its optic axis 16a is set radially around the optical axis of the apparatus within a plane perpendicular to the optical axis of the apparatus.

Further, the polarizing plate 17 is formed as a normal analyzer and disposed such that the azimuth of its transmission axis 17a is set along the same direction at any position within a plane perpendicular to the optical axis of the apparatus. Here, in x-y-z coordinate system, z axis is set so as to coincide with the optical axis of the apparatus, whereas x-y plane is set so as to be perpendicular to the optical axis of the apparatus. Also, the transmission axis 17a of the polarizing plate 17 is set so as to coincide with x-axis direction.

Here, the radial half wavelength plate 16 and the polarizing plate 17 are set as being spatially fixed. By contrast, the normal quarter wavelength plate 15 is disposed so as to be rotatable around the optical axis z. Accordingly, the normal quarter wavelength plate 15, the radial quarter wavelength plate 16, and the polarizing plate 17 are disposed within x-y planes such that the optical axis of the apparatus passes through their respective center portions.

In the following, the principle of operation of such a polarization measuring apparatus will be explained.

In the radial half wavelength plate 16, the azimuth of the optic axis 16a is disposed radially within an x-y plane orthogonal to the optical axis z. Accordingly, the transmitted polarization characteristic in a portion positioned in φ direction with reference to x-axis direction is represented with the Jones matrix $T_{HWP}$ by the following expression (24') which is a modification of the above expression (24).

$$T_{HWP} = R(-\phi)HR(\phi) \qquad (24')$$

The polarization characteristic of the normal quarter wavelength plate 15 whose optic axis 15a rotates by an angle of θ with respect to x axis, which is similar to that of the portion of the radial quarter wavelength plate 13 in the second embodiment positioned in θ direction with respect to x axis, is represented with a Jones matrix notation by the above expression (9). Therefore, the polarization state obtained after the bundle of rays in the polarization state $U_1(\Psi, X)$ of elliptically polarized light having the principal-axis azimuth Ψ and ellipticity X is transmitted through the normal quarter wavelength plate 15 as shown in FIG. 12 is similar to the polarization state $U_2(\Psi, X)$ represented by the above expression (31).

Further, when the azimuth of the optic axis 15a of the normal quarter wavelength plate 15 is in (θ=Ψ) direction, the polarization state of the bundle of rays transmitted through the normal quarter wavelength plate 15 is similar to the polarization state $U_{2L}(\Psi, X)$ represented by the above expression (32). Accordingly, a polarization state $U_3(\Psi, X)$ with respect to φ direction of the bundle of rays transmitted through the radial half wavelength plate 16 is represented by the following expression (37):

$$\begin{aligned}U_3(\Psi, X) &= T_{HWP}U_{2L}(\Psi, X) \\ &= R(-\phi)HR(\phi)U_{2L}(\Psi, X)\end{aligned} \qquad (37)$$

Here, in the case where the polarization state with respect to (φ=π/4+(Ψ+X)/2) azimuth of the bundle of rays transmitted through the radial quarter wavelength plate 16 is taken into consideration and represented by $U_{3L}(\Psi, X)$, when the above three expressions (25), (11), and (32) are input into expression (37), the polarization state $U_{3L}(\Psi, X)$ with respect to (φ=π/4+(Ψ+X)/2) direction is represented by the following expression (38):

$$U_{3L}(\Psi, X) = \begin{pmatrix} 0 \\ 1 \end{pmatrix} \qquad (38)$$

It can be seen from this expression (38) that the polarization state $U_{3L}(\Psi, X)$ with respect to (φ=π/4+(Ψ+X)/2) direction becomes linearly polarized light which vibrates along y-axis direction. Also, since the transmission axis 17a of the analyzer 17 is set so as to coincide with x-axis direction, an extinction state in (φ=π/4+(Ψ+X)/2) direction can be realized.

Figure 13:
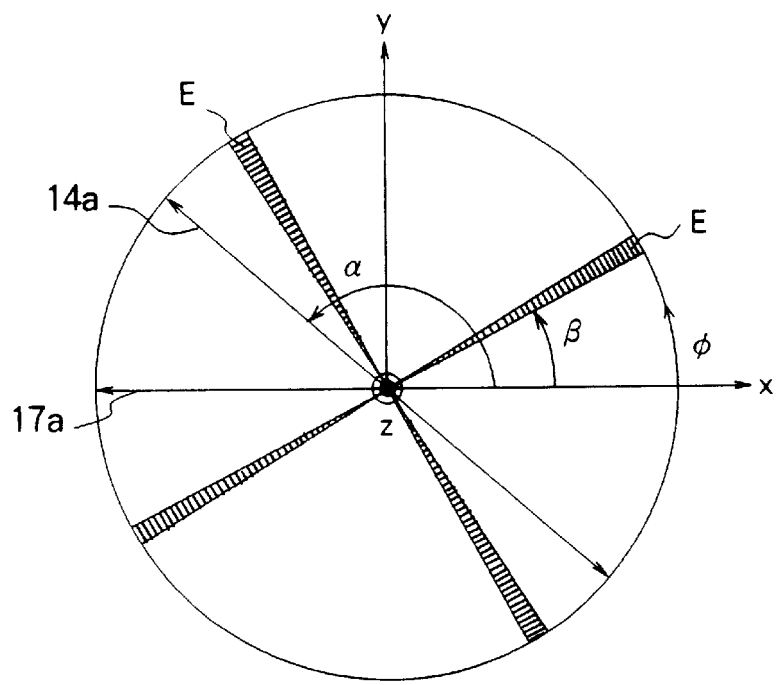
FIG. 13 is a plan view showing a transmission axis of a normal quarter wavelength plate and an extinction azimuth as viewed from the light-emitting side of the polarization measuring apparatus of FIG. 12.

Namely, when the analyzer 17 is in the extinction state as shown in FIG. 13, a relationship represented by the following expressions (39) and (40) is established between an azimuth angle α' of the optic axis 15a of the normal quarter wavelength plate 15 and an azimuth angle β' of extinction E.

$$\alpha' = \Psi \qquad (39)$$

$$\beta' = \pi/4 + (\Psi + X)/2 \qquad (40)$$

Accordingly, the principal-axis azimuth Ψ and ellipticity X of the elliptically polarized bundle of rays $U_1(\Psi, X)$ incident on this polarization measuring apparatus can be determined as being calculated according to the following expressions (41) and (42) by use of the azimuth angle α' of the optic axis 15a of the normal quarter wavelength plate 15 and the azimuth angle β' of extinction E.

$$\Psi = \alpha' \qquad (41)$$

$$X = 2\beta' - \alpha' - \pi/2 \qquad (42)$$

In this embodiment, since the polarizing device rotated around the optical axis of the apparatus is not the radial half wavelength plate 16 but the normal quarter wavelength plate 15 alone, and no trial-and-error operation is necessary for adjusting the optic axis 15a of the normal quarter wavelength plate 15, the polarization state of elliptically polarized light can be easily measured in a short time.

Namely, also in this embodiment, as in the case of the above-mentioned second embodiment, extinction which has been effected in the whole region in the circumferential direction around the optical axis z according to the conventional Senarmont method is effected only in a specific azimuth in the circumpherential direction, thereby using this specific azimuth of extinction as data. Accordingly, the number of polarizing devices, which are rotatable members, can be reduced to one, while trial-and-error measuring operations can be eliminated.

Without being restricted to the foregoing embodiments, the present invention can be modified in various manners. For example, in these embodiments, the phase plate includes the center portion of concentric circles which are interfaces between the first and second material layers, while the center of the incident bundle of rays passes through the center portion of the concentric circles. Nevertheless, it is not necessary for the actual phase plate to be formed so as to include the center portion of the concentric circles, and, even when it is formed so, it is not necessary for the center portion of the concentric circles and the center of the incident bundle of rays to be disposed so as to coincide with each other.

Namely, the actual phase plate may be formed like a member corresponding to only a part of the first quadrant of x-y coordinate system in the phase plate shown in FIG. 3. Also, even when the actual phase plate is formed so as to include the center portion of the concentric circles as in the case of the phase plate shown in FIG. 3, it may be disposed such that the actual incident bundle of rays passes only through a part of the first quadrant in x-y coordinate system.

Further, the actual phase plate may be formed like a member corresponding to a ring portion which is positioned between an inner radius rin and an outer radius $r_{out}$ and satisfies $r_{in} \leq r_n \leq r_{out}$ by using the radius $r_n$ in the n-th interface between the first and second material layers 1 and 2 represented by the above two expressions (7) and (8).

As explained in detail in the foregoing, in accordance with the present invention, phase plates such as concentric quarter wavelength plate and half wavelength plate adopting a form birefringent body are obtained. Accordingly, when these phase plates are used, elliptically polarized light whose principal-axis direction and ellipticity continuously change according to the optic-axis azimuth, linearly polarized light whose vibrating direction continuously changes according to the optic-axis azimuth, and the like can be formed. Since these polarizing devices have a simple configuration, they are quite useful in an optical system which necessitates elliptically polarized light, linearly polarized light, and the like whose polarization states vary spatially or temporally.

Also, in accordance with the present invention, when a phase plate such as quarter wavelength plate or half wavelength plate made of the above-mentioned concentric form birefringent body, i.e., a radial phase plate whose azimuth of optic axis is radially disposed around the optical axis of the apparatus, is used, the number of polarizing members rotated around the optical axis of the apparatus can be reduced to one. Such a polarization measuring apparatus can eliminate operations for adjusting the optic axis or transmission axis of the rotatable polarizing device in a trial-and-error manner, thereby allowing the analysis of elliptically polarized light to be effected simply in a short time.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 329792/1995 filed on Nov. 24, 1995, and No. 262430/1996 filed on Sep. 10, 1996 are hereby incorporated by reference.

What is claimed is:

1. A circumferentially isotropic phase plate comprising:

a plurality of first material layers which are formed by a first material on a transparent substrate and disposed in concentric circles around a predetermined axis, within a plane orthogonal to an incident direction of a bundle of rays; and a plurality of second material layers which are formed by a second material having a refractive index different from that of said first material and disposed in concentric circles around said predetermined axis so as to fill a space between the plurality of said first material layers, wherein the plurality of said first and second material layers are formed such that each layer thickness along the incident direction of said bundle of rays is uniform along a circumferential direction of said concentric circles, thereby constituting, as a whole, a form birefringent body which is isotropic in the circumferential direction of said concentric circles.

2. A phase plate according to claim 1, wherein the plurality of said first and second material layers are formed such that each layer thickness along the incident direction of said bundle of rays further is uniform along a radial direction of said concentric circles, while each layer width along the radial direction of said concentric circles is made constant for each of said first and second material layers at any circular portion of said concentric circles, thereby constituting, as a whole, a form birefringent body which is isotropic in the circumferential direction of said concentric circles and uniform in the radial direction of said concentric circles.

3. A phase plate according to claim 2, wherein each layer thickness and each layer width of the plurality of said first and second material layers are set according to a wavelength of said bundle of rays such that said form birefringent body functions as a quarter wavelength plate with respect to said bundle of rays.

4. A phase plate according to claim 3, wherein, the plurality of said first and second material layers have a common layer thickness t, each layer of the plurality of said first material layers has width $t_1$ and refractive index $n_1$, each layer of the plurality of said second material layers has width $t_2$ and refractive index $n_2$, a constant m is zero or a natural number, and said form birefringent body satisfies the following group of expressions:

$t=(2m+1)\lambda/\{4(n_0-n_e)\}$, $n_0^2=f_1 n_1^2+f_2 n_2^2$, $n_e^2=n_1^2 n_2^2/(f_1 n_2^2+f_2 n_1^2)$, $f_1=t_1/(t_1+t_2)$, and $f_2=t_2/(t_1+t_2)$.

5. A phase plate according to claim 2, wherein each layer thickness and each layer width of the plurality of said first and second material layers are set according to a wavelength of said bundle of rays such that said form birefringent body functions as a half wavelength plate with respect to said bundle of rays.

6. A phase plate according to claim 5, wherein, the plurality of said first and second material layers have a common layer thickness t, each layer of the plurality of said first material layers has width $t_1$ and refractive index $n_1$, each layer of the plurality of said second material layers has width $t_2$ and refractive index $n_2$, a constant n is zero or a natural number, and said form birefringent body satisfies the following group of expressions:

$t=(2n+1)\lambda/[2(n_0-n_e)]$, $n_0^2=f_1 n_1^2+f_2 n_2^2$, $n_e^2=n_1^2 n_2^2/(f_1 n_2^2+f_2 n_1^2)$, $f_1 = t_1/(t_1+t_2)$, and $f_2 = t_2/(t_1+t_2)$.

7. A method of making a circumferentially isotropic phase plate, said method comprising:

a first step of depositing a first material on a transparent substrate so as to form a first material layer;

a second step of drawing a plurality of boundaries in concentric circles around a predetermined axis in said first material layer within a plane orthogonal to said predetermined axis;

a third step of selectively eliminating any of a plurality of regions held between the plurality of boundaries in said first material layer so as to form a plurality of first material layers in concentric circles around said predetermined axis;

a fourth step of depositing, on said transparent substrate, a second material having a refractive index different from that of said first material so as to form a plurality of second material layers in concentric circles around said predetermined axis, filling a space between the plurality of said first material layers; and a fifth step of polishing the plurality of said first and second material layers such that each layer thickness of the plurality of said first and second material layers along a direction of said predetermined axis becomes uniform along a circumferential direction of said concentric circles, thereby constituting said first and second material layers, as a whole, as a form birefringent body which is isotropic in the circumferential direction of said concentric circles.

8. A method according to claim 7, wherein, in said fifth step, each layer thickness of the plurality of said first and second material layers along the direction of said predetermined axis is set so as to further be uniform along a radial direction of said concentric circles, while each layer width of the plurality of said first and second material layers along the radial direction of said concentric circles is made constant for each of said first and second material layers at any circular portion of said is concentric circles, thereby constituting, as a whole, a form birefringent body which is isotropic in the circumferential direction of said concentric circles and uniform in the radial direction of said concentric circles.

9. A method according to claim 8, wherein, in said fifth step, each layer thickness and each layer width of the plurality of said first and second material layers are set according to a wavelength of a bundle of rays incident thereon along the direction of said predetermined axis such that said form birefringent body functions as a quarter wavelength plate with respect to said bundle of rays.

10. A method according to claim 8, wherein, in said fifth step, each layer thickness and each layer width of the plurality of said first and second material layers are set according to a wavelength of a bundle of rays incident thereon along the direction of said predetermined axis such that said form birefringent body functions as a half wavelength plate with respect to said bundle of rays.

11. A method of forming a bundle of rays by use of a circumferentially isotropic phase plate, said method comprising:

a first step of setting a circumferentially isotropic phase plate into an optical path of a bundle of rays, said phase plate comprising a plurality of first material layers which are formed by a first material on a transparent substrate and disposed in concentric circles around a predetermined axis within a plane orthogonal to an incident direction of the bundle of rays and a plurality of second material layers which are formed by a second material having a refractive index different from that of said first material and disposed in concentric circles around said predetermined axis so as to fill a space between the plurality of said first material layers, wherein the plurality of said first and second material layers are formed such that each layer thickness along the incident direction of said bundle of rays is uniform along a circumferential direction of said concentric circles, thereby constituting, as a whole, a form birefringent body which is isotropic in the circumferential direction of said concentric circles; and a second step of transmitting through said phase plate a bundle of rays having a uniform polarization state within a plane orthogonal to the incident direction with respect to said phase plate so as to form, as elliptically polarized light in which at least one of ellipticity and principal-axis azimuth continuously changes along the circumferential direction of the concentric circles of said phase plate, a bundle of rays having a polarization distribution which changes according to the circumferential direction of the concentric circles of said phase plate.

12. A method according to claim 11, wherein set into the optical path of said bundle of rays in said first step is said phase plate in which the plurality of said first and second material layers are formed such that each layer thickness along the incident direction of said bundle of rays further is uniform along a radial direction of said concentric circles, while each layer width along the radial direction of said concentric circles is made constant for each of said first and second material layers at any circular portion of said concentric circles, thereby constituting, as a whole, a form birefringent body which is isotropic in the circumferential direction of said concentric circles and uniform in the radial direction of said concentric circles; and wherein formed in said second step is a bundle of rays having a polarization distribution which changes according to the circumferential direction of the concentric circles of said phase plate while being uniform according to the radial direction of said concentric circles.

13. A method according to claim 12, wherein set into the optical path of said bundle of rays in said first step is said phase plate in which each layer thickness and each layer width of the plurality of said first and second material layers are set according to a wavelength of said bundle of rays such that said form birefringent body functions as a quarter wavelength plate with respect to said bundle of rays; and wherein the polarized light used as the bundle of rays made incident on said phase plate in said second step is one of linearly polarized light and circularly polarized light.

14. A method according to claim 12, wherein set into the optical path of said bundle of rays in said first step is said phase plate in which each layer thickness and each layer width of the plurality of said first and second material layers are set according to a wavelength of said bundle of rays such that said form birefringent body functions as a half wavelength plate with respect to said bundle of rays; and wherein linearly polarized light is used as the bundle of rays made incident on said phase plate in said second step.

15. A polarization measuring apparatus equipped with a circumferentially isotropic phase plate, said apparatus comprising:

a stationary polarization optical system which is spatially fixed and includes a radial phase plate whose azimuth of optic axis is radially disposed around an optical axis of said apparatus; and a rotary polarizing device which is disposed in one of an upstream and a downstream direction with respect to said polarization optical system and is supported so as to be rotatable around the optical axis of said apparatus;

wherein, in a state where a bundle of rays to be measured is made incident on said stationary polarization optical system and said rotary polarizing device while said rotary polarizing device is rotated, when, of said bundle of rays transmitted through both said stationary polarization optical system and rotary polarizing device, any of circumferential directions around the optical axis of said apparatus attains an extinction state, a polarization state of said bundle of rays being incident on said stationary polarization optical system and said rotary polarizing device is measured according to a direction of the optic axis of said rotary polarizing device and the direction of the extinction state of said bundle of rays.

16. An apparatus according to claim 15, wherein said stationary polarization optical system includes a radial quarter wavelength plate as said radial phase plate, while said rotary polarizing device is a polarizing plate disposed on a light-emitting side of said radial quarter wavelength plate.

17. An apparatus according to claim 15, wherein said rotary polarizing device is a normal quarter wavelength plate whose azimuth of optic axis is disposed in the same direction at any portion thereof, while said stationary polarization optical system includes, as said radial phase plate, a radial half wavelength plate disposed on the light-emitting side of said normal quarter wavelength plate and a polarizing plate disposed on a light-emitting side of said radial half wavelength plate.

18. An apparatus according to claim 15, wherein said radial phase plate comprises a plurality of first material layers which are formed by a first material on a transparent substrate and disposed in concentric circles around a predetermined axis within a plane orthogonal to an incident direction of said bundle of rays, and a plurality of second material layers which are formed by a second material having a refractive index different from that of the first material and disposed in concentric circles around said predetermined axis so as to fill a space between the plurality of said first material layers, wherein the plurality of said first and second material layers are formed such that each layer thickness along the incident direction of said bundle of rays is uniform along a circumferential direction of said concentric circles, thereby constituting, as a whole, a form birefringent body which is isotropic in the circumferential direction of said concentric circles.

19. An apparatus according to claim 18, wherein the plurality of said first and second material layers in said radial phase plate are formed such that each layer thickness along the incident direction of said bundle of rays further becomes uniform along a radial direction of said concentric circles, while each layer width along the radial direction of said concentric circles is made constant for each of said first and second material layers at any circular portion of said concentric circles, thereby constituting, as a whole, a form birefringent body which is isotropic in the circumferential direction of said concentric circles and uniform in the radial direction of said concentric circles.

20. An apparatus according to claim 19, wherein each layer thickness and each layer width of the plurality of said first and second material layers in said radial phase plate are set according to a wavelength of said bundle of rays such that said form birefringent body functions as a quarter wavelength plate with respect to said bundle of rays.

21. An apparatus according to claim 20, wherein, the plurality of said first and second material layers have a common layer thickness t, each layer of the plurality of said first material layers has width $t_1$ and refractive index $n_1$, each layer of the plurality of said second material layers has width $t_2$ and refractive index $n_2$, a constant m is zero or a natural number, and said form birefringent body in said radial phase plate satisfies the following group of expressions:

$t=(2m+1)\lambda/[4(n_0-n_e)]$,
$n_0^2=f_1n_1^2+f_2n_2^2$,
$n_e^2=n_1^2n_2^2/(f_1n_2^2+f_2n_1^2)$,
$f_1=t_1/(t_1+t_2)$, and
$f_2=t_2/(t_1+t_2)$.

22. An apparatus according to claim 19, wherein each layer thickness and each layer width of the plurality of said first and second material layers in said radial phase plate are set according to a wavelength of said bundle of rays such that said form birefringent body functions as a half wavelength plate with respect to said bundle of rays.

23. An apparatus according to claim 22, wherein, the plurality of said first and second material layers have a common layer thickness t, each layer of the plurality of said first material layers has width $t_1$ and refractive index $n_2$, each layer of the plurality of said second material layers has width $t_2$ and refractive index $n_2$, a constant n is zero or a natural number, and said form birefringent body in said radial phase plate satisfies the following group of expressions:

$t=(2n+1)\lambda/[2(n_0-n_e)]$,
$n_0^2=f_1n_1^2+f_2n_2^2$,
$n_e^2=n_1^2n_2^2/(f_1n_2^2+f_2n_1^2)$,
$f_1=t_1/(t_1+t_2)$, and
$f_2=t_2/(t_1+t_2)$.

24. A polarization measuring method using a circumferentially isotropic phase plate, said method comprising:

a first step of making a bundle of rays to be measured incident on a polarization measuring apparatus comprising a stationary polarization optical system which is spatially fixed and includes a radial phase plate whose azimuth of optic axis is radially disposed around an optical axis of said apparatus, and a rotary polarizing device which is disposed in one of an upstream and downstream direction with respect to said polarization optical system and is supported so as to be rotatable around the optical axis of said apparatus;

a second step of rotating said rotary polarizing device around the optical axis of said apparatus so as to make, of said bundle of rays transmitted through both said stationary polarization optical system and rotary polarizing device, any of circumferential directions around the optical axis of said apparatus attain an extinction state; and a third step of measuring, based on a direction of the optic axis of said rotary polarizing device and the direction of the extinction state of said bundle of rays, a polarization state of said bundle of rays being incident on said stationary polarization optical system and said rotary polarizing device.

25. A method according to claim 24, wherein, in said first step, said bundle of rays to be measured is successively transmitted through said stationary polarization optical system including, as said radial phase plate, a radial quarter wavelength plate, and a polarizing plate which is said rotary polarizing device.

26. A method according to claim 24, wherein, in said first step, said bundle of rays to be measured is successively transmitted through a normal quarter wavelength plate whose azimuth of optic axis is disposed in the same direction at any portion thereof as said rotary polarizing device, a radial half wavelength plate which is included in said stationary polarization optical system as said radial phase plate, and a phase plate included in said stationary polarization optical system.

27. A method according to claim 24, wherein, set into the optical path of said bundle of rays in said first step is a circumferentially isotropic radial phase plate comprising a plurality of first material layers which are formed by a first material on a transparent substrate and disposed in concentric circles around a predetermined axis within a plane orthogonal to an incident direction of said bundle of rays and a plurality of second material layers which are formed by a second material having a refractive index different from that of said first material and disposed in concentric circles around said predetermined axis so as to fill a space between the plurality of said first material layers, wherein the plurality of said first and second material layers are formed such that each layer thickness along the incident direction of said bundle of rays is uniform along a circumferential direction of said concentric circles, thereby constituting, as a whole, a form birefringent body which is isotropic in the circumferential direction of said concentric circles.

28. A polarization measuring method according to claim 27, wherein set into the optical path of said bundle of rays in said first step is said radial phase plate in which the plurality of said first and second material layers are formed such that each layer thickness along the incident direction of said bundle of rays further is uniform along a radial direction of said concentric circles, while each layer width along the radial direction of said concentric circles is made constant for each of said first and second material layers at any circular portion of said concentric circles, thereby constituting, as a whole, a form birefringent body which is isotropic in the circumferential direction of said concentric circles and uniform in the radial direction of said concentric circles.

29. A polarization measuring method according to claim 28, wherein set into the optical path of said bundle of rays in said first step is said radial phase plate in which each layer thickness and each layer width of the plurality of said first and second material layers are set according to a wavelength of said bundle of rays such that said form birefringent body functions as a quarter wavelength plate with respect to said bundle of rays.

30. A polarization measuring method according to claim 28, wherein set into the optical path of said bundle of rays in said first step is said radial phase plate in which each layer thickness and each layer width of the plurality of said first and second material layers are set according to a wavelength of said bundle of rays such that said form birefringent body functions as a half wavelength plate with respect to said bundle of rays.

* * * * *